United States Patent
Brosnan et al.

(10) Patent No.: US 12,198,181 B2
(45) Date of Patent: Jan. 14, 2025

(54) COLLABORATIVE ITEM LIST DISTRIBUTION SYSTEM, METHOD, AND NON-TRANSITORY COMPUTER-READABLE STORAGE MEDIUM

(71) Applicant: Toshiba Global Commerce Solutions Holdings Corporation, Tokyo (JP)

(72) Inventors: Susan W. Brosnan, Raleigh, NC (US); Jessica Snead, Cary, NC (US); Patricia Hogan, Raleigh, NC (US); Daniel R. Goins, Wake Forest, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 0 days.

(21) Appl. No.: 18/466,939

(22) Filed: Sep. 14, 2023

(65) Prior Publication Data

US 2023/0419389 A1    Dec. 28, 2023

Related U.S. Application Data

(63) Continuation of application No. 17/350,635, filed on Jun. 17, 2021, now Pat. No. 11,798,063.

(51) Int. Cl.
*G06Q 30/00*    (2023.01)
*G06Q 30/0601*    (2023.01)

(52) U.S. Cl.
CPC ..... *G06Q 30/0635* (2013.01); *G06Q 30/0631* (2013.01)

(58) Field of Classification Search
CPC .............. G06Q 30/0635; G06Q 30/0631
USPC ................................................ 705/26.81
See application file for complete search history.

(56) References Cited

U.S. PATENT DOCUMENTS

| | | | |
|---|---|---|---|
| 9,911,290 B1* | 3/2018 | Zalewski | G06Q 20/12 |
| 11,341,553 B1* | 5/2022 | Borunda | G06Q 30/0641 |
| 2014/0067564 A1 | 3/2014 | Yuan | G06Q 30/0641 |
| | | | 705/16 |
| 2015/0006308 A1 | 1/2015 | Lin | G06Q 30/0633 |
| | | | 705/26.2 |

(Continued)

OTHER PUBLICATIONS

Botsali, A. R. (2007). Retail facility layout design (Order No. 3270313). Available from ProQuest Dissertations & Theses Global. (304730138). Retrieved from https://www.proquest.com/dissertations-theses/retail-facility-layout-design/docview/304730138/se-2 (Year: 2007).*

*Primary Examiner* — Arielle E Weiner
(74) *Attorney, Agent, or Firm* — Stanek Lemon Crouse & Meeks, P.A.

(57) ABSTRACT

A method of assigning products to shoppers can be provided by determining that a plurality of shoppers are collaborating with one another to purchase a plurality of products included on a shared shopping list, receiving shopper characteristics for the plurality of shoppers, receiving respective parameters for the plurality of products included on the shared shopping list, assigning respective sub-lists of the plurality of products for picking by respective ones of the shoppers at a retail shopping location based on the shopper characteristics for the respective ones of the shoppers and the respective parameters for the plurality of products included on the shared shopping list, and providing the respective sub-lists of the plurality of products to the plurality of shoppers. Related systems are also disclosed.

17 Claims, 5 Drawing Sheets

(56) References Cited

U.S. PATENT DOCUMENTS

| | | | |
|---|---|---|---|
| 2016/0033287 A1* | 2/2016 | High | H04W 4/029 |
| | | | 701/522 |
| 2016/0110797 A1* | 4/2016 | Brosnan | H04N 7/181 |
| | | | 705/26.8 |
| 2016/0125507 A1 | 5/2016 | Bueno Lobl | G06Q 30/0613 |
| | | | 705/26.41 |
| 2016/0258762 A1 | 9/2016 | Taylor | G05D 1/0293 |
| 2016/0267306 A1* | 9/2016 | Atikoglu | G06Q 10/087 |
| 2017/0352019 A1* | 12/2017 | Li | G06Q 20/384 |
| 2019/0066169 A1 | 2/2019 | Costello | H04N 7/181 |
| 2019/0251619 A1 | 8/2019 | Kuchenski | G06Q 30/0639 |
| 2019/0325377 A1 | 10/2019 | Rajkhowa et al. | |
| 2021/0157998 A1* | 5/2021 | Rodriguez | G06V 20/20 |

* cited by examiner

| Shopper Characteristics | Mobility (M) 1-5 | Physical Ability (PA) 1-5 | Allergy Ingredient(s) (AL) | Aversion Category (AV) |
|---|---|---|---|---|
| Product Parameters | Distance (D) | Physical Package (PP) | Ingredients (I) | Category (C) |

Score for Shopper Relative To Particular Product = [ (M)(D) + (PA)(PP) ] * (Aversion Factor) * (Allergy Factor)

Aversion Factor: If Aversion Category (AV) = Product Category (C) then = ∅, Otherwise = 1

Allergy Factor: If Allergy Ingredient (AL) is = any Product Ingredient (I) then = ∅, Otherwise = 1

FIG. 4

COLLABORATIVE ITEM LIST DISTRIBUTION SYSTEM, METHOD, AND NON-TRANSITORY COMPUTER-READABLE STORAGE MEDIUM

CROSS-REFERENCE TO RELATED APPLICATION

The present application is a continuation of U.S. patent application Ser. No. 17/350,635, filed Jun. 17, 2021, entitled "Methods of assigning products from a shared shopping list to participating shoppers using shopper characteristics and product parameters and related systems," the content of which is hereby incorporated herein by reference in its entirety.

FIELD

The present invention relates to the field of data processing, in general, and to retail sales data processing in particular.

BACKGROUND

Existing shopping list applications such as Grocery Pal™, can provide the capability to create shopping lists that can be used during shopping trips. In the area of order fulfillment, such as e-commerce, it is known to hold and distribute customer orders simultaneously to pickers in a facility in one or more batches. The pickers can collect products in the orders from product locations within the facility and bring the products to a central location where they are organized, packed, and shipped to customers, as discussed for example in U.S. Patent Publication No. 2019/0325377.

SUMMARY

Embodiments according to the present invention can provide methods of assigning products from a collaborative shopping list to participating shoppers using shopper characteristics and product parameters and related systems. Pursuant to these embodiments, a method of assigning products to shoppers can be provided by determining that a plurality of shoppers are collaborating with one another to purchase a plurality of products included on a shared shopping list, receiving shopper characteristics for the plurality of shoppers, receiving respective parameters for the plurality of products included on the shared shopping list, assigning respective sub-lists of the plurality of products for picking by respective ones of the shoppers at a retail shopping location based on the shopper characteristics for the respective ones of the shoppers and the respective parameters for the plurality of products included on the shared shopping list, and providing the respective sub-lists of the plurality of products to the plurality of shoppers.

BRIEF DESCRIPTION OF THE DRAWINGS

FIG. 4 is a schematic illustration of a scoring method used to assign particular products to particular shopper sub-lists based on the characteristics of the shoppers and the parameters of the products on the shopping list in some embodiments according to the invention.

DETAILED DESCRIPTION OF EMBODIMENTS ACCORDING TO THE INVENTION

Figure 1:
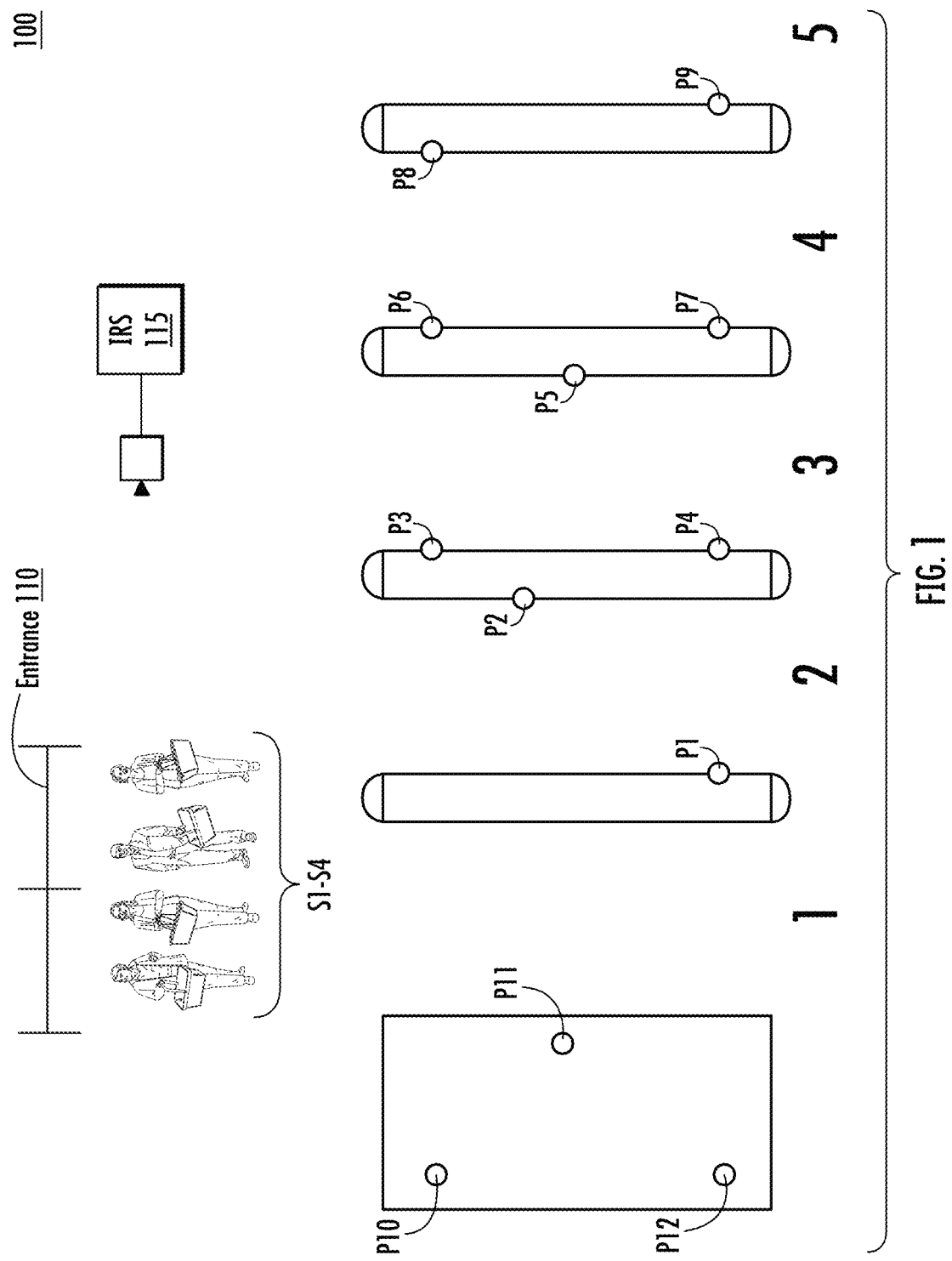
FIG. 1 is a schematic illustration of a retail store layout including aisles with shelving and other displays configured to hold products for picking by shoppers in some embodiments according to the invention.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, in some embodiments according to the invention, products that appear on a shared shopping list can be assigned for "picking" (i.e., retrieval from a shelf or display) to selected shoppers within a group of shoppers that are determined to be collaborating on the purchase of the products. The assignment of products from the share shopping list can be based on a combination of the determined shopper characteristics of the shoppers in the group and the parameters of the products on the shared shopping list. For example, in some embodiments according to the invention, shoppers who are determined to be relatively mobile (e.g., a shopper characteristic) can be assigned to pick products that are located relatively far from an entrance to the retail location (e.g., a product parameter) or lie along a long path that may be taken by a shopper to also conveniently retrieve other products. Conversely, shoppers who are determined to have lower mobility can be assigned to pick products that are closer to the entrance, for example.

Furthermore, a number of the shopper characteristics and product parameters can be combined with one another so that more than one shopper characteristic and/or product parameter can be considered in assigning particular products for picking by particular shoppers. For example, in some embodiments according to the invention, the shopper's physical ability (such as relative reaching, lifting, and bending ability) can be combined with the product placement (such as what shelf the product is located on) both of which can be further combined with the mobility characteristic and location parameter described above to further refine the assignment of which products are to be picked by what shoppers, Accordingly, a number of shopper characteristics can be combined with respective product parameters to optimize the product assignments within the group of shoppers.

In some embodiments according to the invention, the shopper characteristics of the shoppers can be determined through a number of approaches. For example, in some embodiments according to the invention, the shoppers can provide information that can be used to derive some of the shopper characteristics which may be used, such as height, age, weight, activity interests (such as sports in which they participate). In some embodiments according to the invention, the shoppers can be prompted for ratings for the shopper characteristics used to determine which products to assign to the shoppers in the group. For example, in some embodiments according to the invention, the shoppers can be promoted to rate their mobility, physical ability, etc. The information may then be associated with the respective shopper's loyalty program account so that the information can be provided when the shopper is indicated as participating in a shared shopping list and is detected as present at a retail location.

In still further embodiments according to the invention, the group of shoppers can be determined as collaborating through a number of alternative approaches. For example, in some embodiments according to the invention, the group of shoppers can register in advance as sharing a shopping list by providing the shared shopping list and providing their respective identification information, such as their respective loyalty program numbers, their mobile phone number, etc. When the group of shoppers arrives at the retail location for shopping, one or more of the shoppers can initiate a shared shopping application which has access to the group's registration information. Alternatively, in embodiments according to the invention, the shared shopping application may be instantiated automatically when one or more of the shoppers participating in the shared shopping list is detected at a retail location.

FIG. 1 is a schematic illustration of a retail store layout 100 including aisles 1-5 with shelving and other displays configured to hold products P1-P12 for picking by shoppers S1-S4 in some embodiments according to the invention. According to FIG. 1, the shoppers S1-S4 can be detected arriving, for example, at an entrance 110 or parking area of the retail location 100. Upon detecting the presence of at least one the shoppers S1-S4, the system can determine whether the shoppers S1-S4 are collaborating on the purchase of products that are listed on a shared shopping list in some embodiments according to the invention.

It will be understood that the determination that the shoppers S1-S4 are collaborating can be accomplished by of various approaches. For example, in some embodiments according to the invention, if at least one of the shoppers S1-S4 has registered as using a shared shopping list, the shopper's mobile device (using an app, for example, that is used for the shared shopping list) may announce the presence of the shopper. Similarly, the other shoppers may also be identified as participating in the same shared shopping list, which can be used to identify other ones of the shoppers in the group. It will be understood that the shoppers may also elect to use an electronic device supplied by the retail location, which may prompt the shopper for identification.

In some embodiments, an image recognition system 115 can access a facial recognition system to identify at least one of the shoppers S1-S4. In some embodiments according to the invention, the system may then use the identity of the shopper to access a database of shared shopping lists to determine whether the recognized shopper has posted a shared shopping list for use during a collaborative trip to the retail location 100. Similarly, the other shoppers may also be identified by the facial recognition system which can then be used to determine whether those shoppers are part of the group of shoppers collaborating in the shared shopping list.

In still further embodiments according to the invention, the image recognition system 115 may recognize the shoppers S1-S4 as being together and may prompt at least one of the recognized shoppers S1-S4 as to whether that group is participating in a collaborative shopping trip using a shared shopping list. If the response indicates that they are collaborating in the purchase of products, the system may request identification from each of the shoppers S1-S4 or may utilize data from the mobile devices associated with the shoppers S1-S4 to identify the shoppers.

It will be understood that once the shoppers S1-S4 are recognized by the system, shopping characteristics for each of the shoppers S1-S4 can be accessed by the system. As described herein, the shopping characteristics of the shoppers S1-S4 can include data which describes the capabilities and slash or restrictions that may be associated with particular shoppers. For example, in some embodiments according to the invention, the shopping characteristics of the shoppers S1-S4 can include a mobility rating for the shopper (such as how easily the shopper is able to move around the location 100), a physical capability rating (such as a rating that indicates how able the shopper is to retrieve products from displays), an allergy characteristic (such as being allergic to peanut), and an aversion characteristic (such as a category of a product that the shopper prefers to avoid—such as alcohol, candy, etc.). It will be understood that the preceding list is only an example of the characteristics that may be associated with shoppers and other characteristics may also be included and/or derived from shopper characteristics that are explicitly listed. In some embodiments according to the invention, a natural language processing system can derive shopper characteristics from unstructured data provided by the shopper.

As further shown in FIG. 1, products P1-P12 are placed in various locations within the store layout 100. Although twelve products are shown in FIG. 1 it will be understood that any number of products can be in the retail store layout 100. It will be understood that once the system can access a shared shopping list as described above, the parameters associated with each of those products P1-P12 can also be accessed. In some embodiments according to the invention. the associated parameters of the products can include, for example, the location of the products within the retail location 100, the shelf height at which the products are placed, the ingredients in the product, the physical attributes of the product (such as weight, overall dimensions, a bulkiness rating, whether the product has a handle as part of the packaging, etc.). It will be understood that the preceding list is only an example of the parameters that may be associated with the products and other parameters may also be included and/or derived from product parameters that are explicitly listed.

The system can then combine the shopper characteristics of the shoppers S1-S4 with the parameters for the products included on the shared shopping list to assign particular ones of the products P1-P12 for retrieval by the particular ones shoppers S1-S4. Accordingly, a respective sub-list may be provided to each of the shoppers S1-S4 which is tailored to suit their shopping capability given the particular products on the list.

Figure 2:
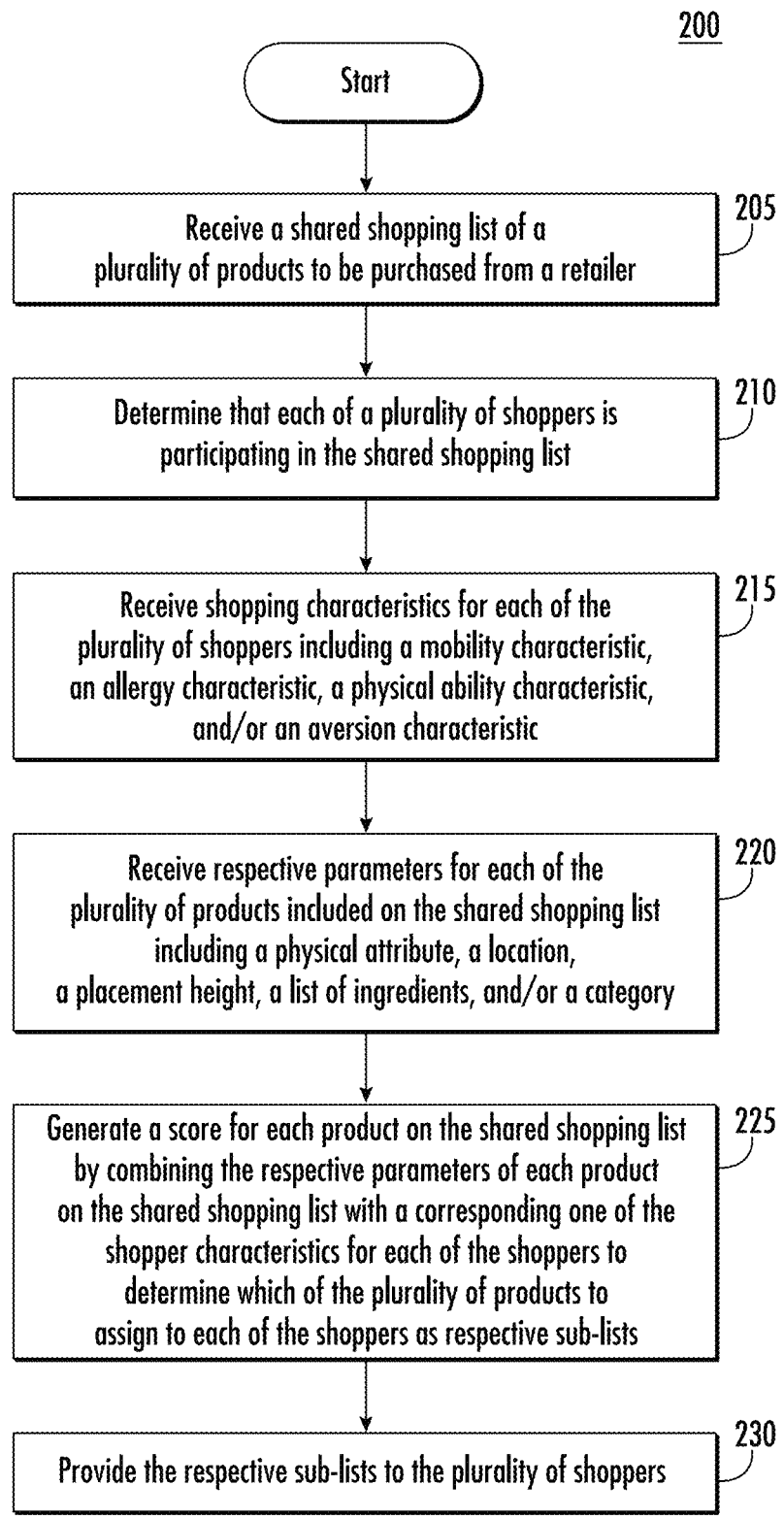
FIG. 2 is a flowchart illustrating methods of assigning products on a shared shopping list to respective shopper sub-lists for picking during shopping in some embodiments according to the invention.

FIG. 2 is a flowchart illustrating methods 200 of assigning products on the shared shopping list to respective shoppers sub-lists for selection during shopping in some embodiments according to the invention. According to FIG. 2, the shared shopping list has already been provided or determined in advance of the presence of the shoppers S1-S4 or alternatively is provided dynamically by the shoppers upon arrival at the retail location 100 (Block 205). Still further the system determines that each of the plurality of shoppers S1-S4 is participating in the collaborative shopping list received by the system (Block 210). In some embodiments according to the invention, this determination can be made based on an affirmative response from each of the shoppers S1-S4 or alternatively by registering in advance in a database that is accessible to the system as described herein.

The system then receives the shopper characteristics for each of the plurality of shoppers S1-S4. In some embodiments according to the invention, the shopper characteristics of can include a mobility characteristic or rating that defines the relative mobility of the respective shopper (block 215). For example, a rating 5 in a range of 1-5 may represent a shopper that is relatively mobile whereas a rating of 1 can indicate that the shopper is less mobile, such as when the shopper may need the assistance of a cane or walking frame. The shopper characteristics can also include a physical ability characteristic that indicates a rating of how capable the shopper is in reaching and retrieving products that are stored on a higher shelf such or on a lower shelf that may require bending. In some embodiments according to the invention, a rating of 1 may indicate relatively little ability to reach and lift objects whereas a rating of 5 may indicate very little restriction where products may be reached and retrieved by the shopper. The shopper characteristics can also include an allergy characteristic which indicates an allergy to ingredients. The shopper characteristics can also include an aversion characteristic that indicates category(s) of product(s) that the shopper prefers to avoid being exposed to during the shopping trip, such as candy, alcohol, tobacco, or other products.

Still further, the system can receive the respective parameters for each of the products listed on the shared shopping list (block 220). In some embodiments according to the invention, the respective parameters for each of the products can include, for example, a location of the product within the store which indicates the distance that may need to be traveled by the shopper to reach the location of the particular product, a placement height of the product at the location, a list of ingredients in the product, and a category in which the product is included, and an indication of the physical attributes of the product such as its weight, its overall size, whether the product has a handle, etc.

In some embodiments according to the invention, once the system receives the shopper characteristics and the parameters for the products on the shared shopping list, the system can generate a score for each product on the shared shopping list by combining the respective parameter of the product with the shopper characteristics for each of the shoppers (Block 225). Accordingly, the system may generate a score for each of the shoppers to pick the particular product on the list and then may compare the scores for each shopper to determine which shopper should be assigned to pick the particular product. For example, a certain product may be relatively bulky or heavy and therefore the system may determine that a particular shopper who is well suited for retrieving that product in that location is best suited for retrieving that product whereas a second shopper who has a lower rating or is less mobile may avoid having that product assigned. Accordingly, in some embodiments according to the invention, the system can determine a respective sub-list for each of the shoppers to retrieve during the shared shopping trip (Block 230).

Figure 3:
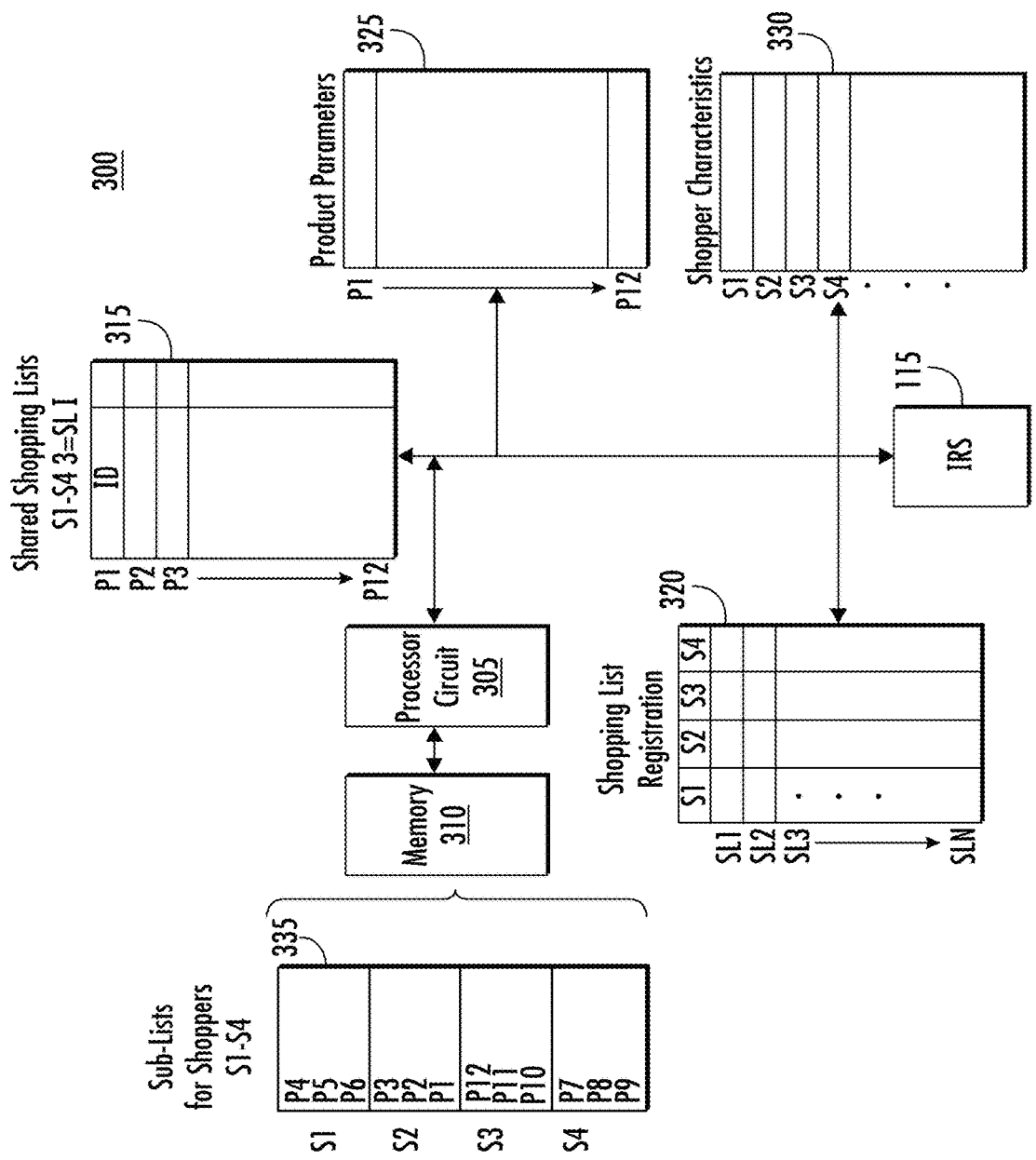
FIG. 3 is a block diagram of a system configured to assign products on the shared shopping list to the respective shopper sub-lists based on characteristics of the shoppers and parameters of the products on the shared shopping list in some embodiments according to the invention.

FIG. 3 is a block diagram of a system 300 configured to assign products P1-P12 on the shared shopping list 315 to the respective shopper sub-lists 335 based on characteristics of the shoppers and parameters of the products on the shared shopping list 315 in some embodiments according to the invention. According to FIG. 3, in some embodiments according to the invention, the system 300 can operate using a processor circuit 305 that is operatively coupled to a memory 310.

As further shown in FIG. 3, the processor circuit is operatively coupled to services that can provide the data described herein. In particular, the processor circuit 305 can access a shopping list registration system 320 that includes shared shopping lists (SL1-SLn) and each of the shoppers that is collaborating on the respective shopping list. For example, shopping list SL1 includes a reference to shoppers S1-S4 and thereby indicates that shoppers S1-S4 are collaborating on the purchase of products listed in shopping list SL1.

As further shown in FIG. 3, in some embodiments according to the invention, the processor circuit 305 is also coupled to a shared shopping list database 300 that includes the products listed on each of the shopping lists stored in the shopping list registration system 320. For example, the shared shopping list database 315 includes an instantiation of shopping list SL1 that includes products P1-P12 on the shared shopping list SL1 and are to be purchased by the shoppers S1-S4 during the collaborative shopping trip. As further shown in FIG. 3 the shared shopping list database 315 includes an identification for each of the products P1-P12.

The processor circuit 305 is also operatively coupled to a product parameters database 325 that stores the parameters for each of the products included on the shared shopping list SL1. As described herein, the product parameters can include, for example, the location of the product at the retail location, a physical attribute (such as weight, bulkiness, etc.), a list of ingredients in the product, and a category in which the product is included. It will be understood that although the databases shown herein are described as including all of the information described, the system 300 may provide the parameters and characteristics described herein by referring to other systems which are also operatively coupled to the system 300 and may not necessarily be included in a single system.

As further shown in FIG. 3, the processor circuit 305 includes a shopper characteristics database 330 which includes the characteristics of the shoppers S1-S4 as described herein. As further shown in FIG. 3 the system 300 can also be operatively coupled to the image recognition system 115 that can be used to identify the presence of the shoppers S1-S4 as well as the identities of the shoppers S1-S4 so that the characteristics of the shoppers can be retrieved by the processor circuit 305 in some embodiments according to the invention. It will be understood that in some embodiments according to the invention, the identification of the shoppers S1-S4 is provided so that the shoppers can be associated with the shared shopping list while also avoiding identifying the shoppers' private information such as the shoppers' names. For example, in some embodiments according to the invention, the identification can be provided by associating the shoppers with respective loyalty membership numbers, physical attributes of the shoppers, or similar information that identifies that the shopper is participating in the shared shopping list while avoiding the personal identification of the shopper.

Once the processor circuit 305 has access to the product parameters for P1-P12 stored in the product parameter database 325 and the shopper characteristics for S1-S4 listed in the shopper characteristic database 330, the processor circuit 305 can determine which of the products to assign to the shoppers S1-S4 and thereby create the respective sub-list for each of the shoppers S1-S4 shown in the data structure 335. For example, in the exemplary embodiment shown in FIG. 3, shopper S1 is assigned to retrieve products P4-P6, shopper S2 is assigned to retrieve products P1-P3, shopper S3 is assigned to retrieve products P10-P12, and shopper S4 is assigned to retrieve products P7-P9.

FIG. 4 is a schematic illustration of a scoring method 400 used to assign particular products to particular shopper sub-lists based on the characteristics of the shoppers and the parameters of the products on the shopping list in some embodiments according to the invention. According to FIG. 4, the schematic representation of the shopper characteristics are shown as including a mobility rating (M) which can be provided on a scale of 1 to 5 where 1 represents relatively little mobility, whereas 5 represents greater mobility, a physical ability (PA) also having a rating of 1 to 5, an allergy ingredient (AL) which lists ingredients or materials that the particular shopper is allergic to, and an aversion category (AV) identifying categories of products that the shopper prefers to avoid exposure to during a shopping trip.

As further shown in FIG. 4, the product parameters stored in the product parameter database 325 can include the distance (D) that the location of the particular product represents from the entrance of the retail location 100 to the placement of the product at the retail location, the physical package (PP) of the product, a list of ingredients (I) in the product, and the category (C) in which the product is included.

As further shown in FIG. 4, the score for a particular shopper to retrieve a particular product can be determined by combining the characteristics for the shopper with the parameters for the particular product under analysis. Accordingly, in some embodiments according to the invention, the score for a shopper relative to a particular product can be determined by:

$$\text{Score}=[(M \times D)+(PA) \times (PP)] \times (\text{Allergy Factor}) \times (\text{Aversion Factor}) \quad (1)$$

In some embodiments according to the invention, the allergy factor and the aversion factor can be 0 or 1 whereby if the shopper has indicated that they have a particular allergy to a material and that material is included as an ingredient in the product, the allergy factor can be set to 0. Accordingly, if the shopper has an allergy to an ingredient in the product, a factor of 0 will result in the score for the shopper relative to the particular product to be 0. Similarly, the aversion factor can be set to 0 if a product is included in a category which generally describes a product which the shopper would like to avoid exposure to during the shopping trip. Thereby if the aversion factor is 0, the score for the shopper relative to the particular product may also be 0. Accordingly, either an allergy factor or an aversion factor of 0 will result in the score for the shopper relative to the particular product to be 0. Otherwise, the allergy factor and the aversion factor can be set to 1.

Accordingly, if the score for the particular shopper relative to the product is 0, that shopper will not be assigned to retrieve that product during the shopping trip. Although the combination of the parameters and shopper characteristics described above according to Equation (1) it will be understood that other techniques may be used to combine the characteristics and parameters as described herein which will result in the assignment of products for retrieval by particular ones of the shoppers S1-S4.

In still further embodiments according to the invention, the score for the shopper relative to the physical product can be determined based on equalizing the number of products assigned to each of the shoppers, or alternatively can be determined to equalize the time that is estimated for each of the shoppers to retrieve their assigned products. For example, in some embodiments according to the invention, shoppers that have a lower mobility rating may be assigned fewer products whereas shoppers with higher mobility may be assigned more products so that the time that is estimated for each of the shoppers to gather their respective products on their sub-lists is reduced so that all shoppers are estimated to complete their shopping at about the same time.

Figure 5:
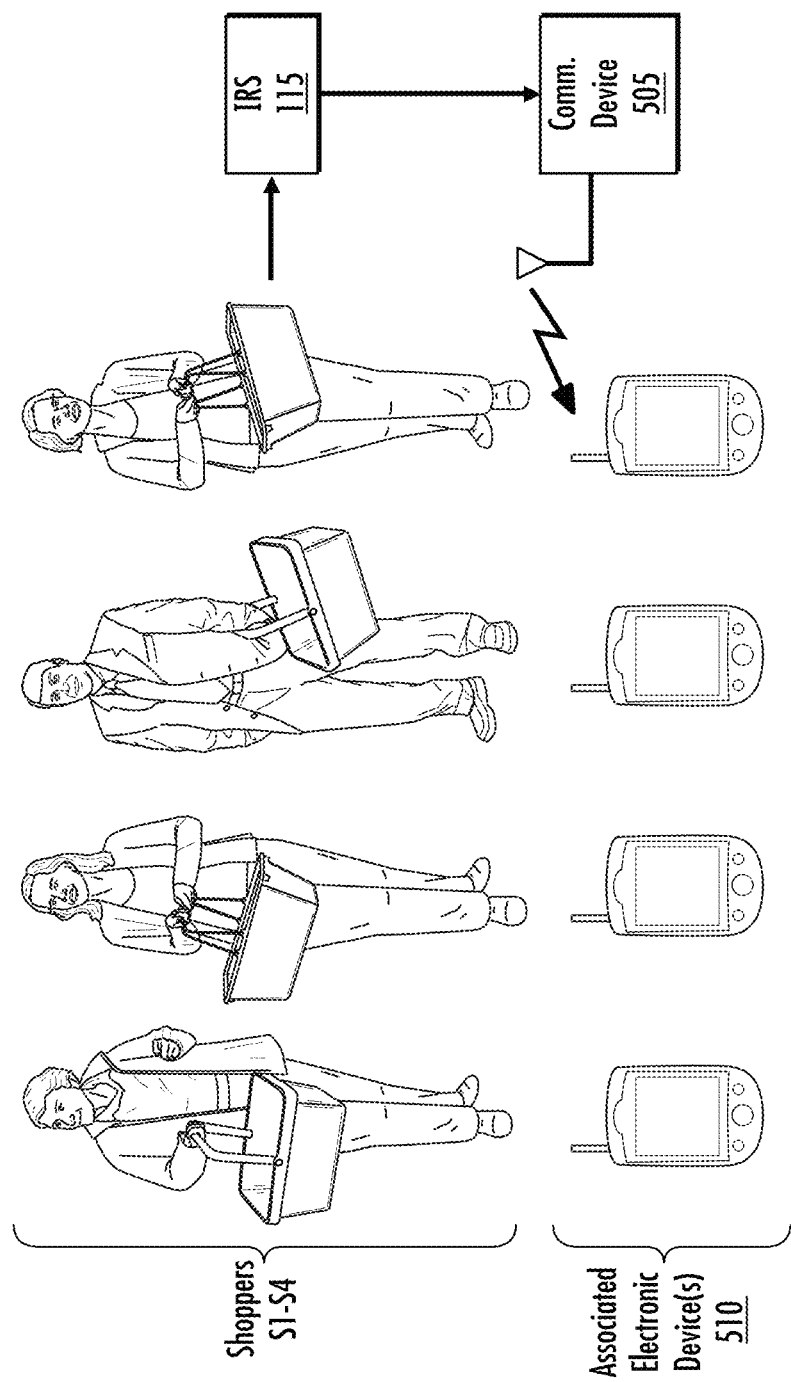
FIG. 5 is a schematic illustration of methods of determining whether shoppers are using a shared shopping list in some embodiments according to the invention.

FIG. 5 is a schematic illustration of methods of determining whether shoppers S1-S4 are collaborating using a shared shopping list in some embodiments according to the invention. According to FIG. 5 the shoppers S1-S4 are shown being detected by the image recognition system 115. Once being detected, the image recognition system 115 can communicate with a communications device 505 which can detect any one of a mobile device 510 that is associated with the plurality of shoppers S1-S4 which may aide in identifying the shoppers as S1-S4 and/or retrieving a shopping list which is intended to be a shared shopping list for the collaborative shopping trip. Still further, the system may use the communication device 505 to query each of the shoppers S1-S4 if they are participating in a collaborative shopping trip and if they would like to provide a shared shopping list for the trip which may then be utilized by the system 300 in FIG. 3 to access the information such as the product parameters and shoppers characteristics so as to assign each of the shoppers S1-S4 a respective sub-list dynamically.

As described herein, products that appear on a shared shopping list can be assigned for "picking" (i.e., retrieval from a shelf or display) to selected shoppers within a group of shoppers that are determined to be collaborating on the purchase of the products. The assignment of products from the share shopping list can be based on a combination of the determined shopper characteristics of the shoppers in the group and the parameters of the products on the shared shopping list. For example, in some embodiments according to the invention, shoppers who are determined to be relatively mobile (e.g., a shopper characteristic) can be assigned to pick products that are located relatively far from an entrance to the retail location (e.g., a product parameter) or lie along a long path that may be taken by a shopper to also conveniently retrieve other products. Conversely, shoppers who are determined to have lower mobility can be assigned to pick products that are closer to the entrance, for example.

Furthermore, a number of the shopper characteristics and product parameters can be combined with one another so that more than one shopper characteristic and/or product parameter can be considered in assigning particular products for picking by particular shoppers. For example, in some embodiments according to the invention, the shopper's physical ability (such as relative reaching, lifting, and bending ability) can be combined with the product placement (such as what shelf the product is located on) both of which can be further combined with the mobility characteristic and location parameter described above to further refine the assignment of which products are to be picked by what shoppers, Accordingly, a number of shopper characteristics can be combined with respective product parameters to optimize the product assignments within the group of shoppers.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises,"

"comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL, The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A method, comprising:
    detecting, by a system, a presence of a plurality of users at a retail location by detecting indications of presence from respective mobile devices associated with the plurality of users, wherein each mobile device comprises a processor configured to execute instructions for a mobile application, the instructions causing the respective mobile devices to transmit the indications of presence;
    receiving image data captured by an image capture device, the image data comprising the plurality of users;
    processing the image data using an image recognition system operatively coupled to the image capture device and the system, and analyzing appearance and behavioral attributes of the plurality of users;
    identifying, by the system, activities indicative of a coordinated operational behavior based on the appearance and the behavioral attributes of the plurality of users;
    retrieving, by the system, telephony identifiers for the plurality of users;
    querying, by a communications device associated with the system, each respective mobile device of each user of the plurality of users using the telephony identifiers, wherein the querying requests confirmation of the coordinated operational behavior;
    receiving, by the communications device associated with the system, the confirmation from at least one of the respective mobile devices;
    in response to receiving the confirmation, retrieving a shared item list, the shared shopping list comprising an indication of a plurality of items;
    generating, by the system, a score for each item of the plurality of items for each user of the plurality of users, using a weighted combination of the appearance and the behavioral attributes of the respective user and product information of a respective item;
    assigning, by the system and based on the score for each item of the plurality of items for each user of the plurality of users, at least one item of the plurality of items to each user of the plurality of users based on the appearance and the behavioral attributes of the plurality of users and characteristics of the plurality of items; and
    in response to assigning the at least one item of the plurality of items to each user of the plurality of users, causing a graphical element to be displayed on a display of a respective mobile device of each of the plurality of users, the graphical element corresponding to assignment information, the assignment information comprising indications of items assigned to the respective user.

2. The method of claim 1, wherein the product information comprises an indication of location within a retail store, placement height, list of ingredients, weight attributes, or size attributes.

3. The method of claim 1, wherein the appearance and behavioral attributes comprises at least one of an age, a weight, a mobility level, a reaching ability, a lifting ability, or a bending ability of the respective user.

4. The method of claim 1, further comprising determining characteristics of each user by processing the image data, wherein the assigning is further based on the characteristics of each user, wherein the characteristics of each user comprises at least one of an age, a weight, a mobility level, a reaching ability, a lifting ability, a bending ability, an allergy characteristic indicative of an allergy, or an aversion characteristic indicative of a category of products that the respective user prefers to avoid exposure to.

5. The method of claim 1, further comprising:
    utilizing the score to determine a sub-list of items for each user of the plurality of users, wherein the sub-list comprises at least one item from the plurality of items that has a highest generated score relative to the appearance and the behavioral attributes of the respective user.

6. The method of claim 5, wherein the sub-list of items for each user is accessible via the respective mobile device associated with the respective user.

7. The method of claim 1, wherein the retrieving the telephony identifiers for the plurality of users is based on pre-registered identification credentials associated with a loyalty program.

8. The method of claim 1, wherein the processing of the image data is performed by the image recognition system, wherein the image recognition system is operatively coupled to a facial recognition system.

9. The method of claim 1, further comprising providing an interface on the respective mobile device associated with each user for viewing and modifying the items assigned to the respective user.

10. The method of claim 1, wherein the image data comprises the plurality of users at a retail location.

11. A system comprising one or more processors configured to:
    detect a presence of a plurality of users at a retail location by detecting indications of presence from respective mobile devices associated with the plurality of users, wherein each mobile device comprises a processor configured to execute instructions for a mobile application, the instructions causing the respective mobile devices to transmit the indications of presence;
    receive image data captured by an image capture device, the image data comprising the plurality of users;
    process the image data using an image recognition system operatively coupled to the image capture device and the system, and analyze appearance and behavioral attributes of the plurality of users;
    identify, by the system, activities indicative of a coordinated operational behavior based on the appearance and the behavioral attributes of the plurality of users;
    retrieve, by the system, telephony identifiers for the plurality of users;
    query, by a communications device associated with the system, each respective mobile device of each user of the plurality of users using the telephony identifiers, wherein the querying requests confirmation of the coordinated operational behavior;
    receive, by the communications device associated with the system, the confirmation from at least one of the respective mobile devices;
    in response to receiving the confirmation, retrieve a shared item list, the shared shopping list comprising an indication of a plurality of items;
    generate, by the system, a score for each item of the plurality of items for each user of the plurality of users, using a weighted combination of the appearance and the behavioral attributes of the respective user and product information of a respective item;

assign, by the system and based on the score for each item of the plurality of items for each user of the plurality of users, at least one item of the plurality of items to each user of the plurality of users based on the appearance and the behavioral attributes of the plurality of users and characteristics of the plurality of items; and in response to assigning the at least one item of the plurality of items to each user of the plurality of users, cause a graphical element to be displayed on a display of a respective mobile device of each of the plurality of users, the graphical element corresponding to assignment information, the assignment information comprising indications of items assigned to the respective user.

12. The system of claim 11, wherein the product information comprises an indication of location within a retail store, placement height, list of ingredients, weight attributes, or size attributes.

13. The system of claim 11, wherein the appearance and behavioral attributes comprises at least one of an age, a weight, a mobility level, a reaching ability, a lifting ability, or a bending ability of the respective user.

14. The system of claim 11, wherein the one or more processors are further configured to determine characteristics of each user by processing the image data, wherein the characteristics of each user comprises at least one of an age, a weight, a mobility level, a reaching ability, a lifting ability, a bending ability, an allergy characteristic indicative of an allergy, or an aversion characteristic indicative of a category of products that the respective user prefers to avoid exposure to.

15. The system of claim 11, wherein the one or more processors are further configured to utilize the score to determine a sub-list of items for each user of the plurality of users, wherein the sub-list comprises at least one item from the plurality of items that has a highest generated score relative to the appearance and the behavioral attributes of the respective user, wherein the sub-list of items for each user is accessible via the respective mobile device associated with the respective user.

16. Non-transitory computer-readable storage medium storing computer-executable instructions that when executed by one or more processors cause the one or more processors to:

detect a presence of a plurality of users at a retail location by detecting indications of presence from respective mobile devices associated with the plurality of users, wherein each mobile device comprises a processor configured to execute instructions for a mobile application, the instructions causing the respective mobile devices to transmit the indications of presence;

receive image data captured by an image capture device, the image data comprising the plurality of users;

process the image data using an image recognition system operatively coupled to the image capture device and a system, and analyze appearance and behavioral attributes of the plurality of users;

identify, by the system, activities indicative of a coordinated operational behavior based on the appearance and the behavioral attributes of the plurality of users;

retrieve, by the system, telephony identifiers for the plurality of users;

query, by a communications device associated with the system, each respective mobile device of each user of the plurality of users using the telephony identifiers, wherein the querying requests confirmation of the coordinated operational behavior;

receive, by the communications device associated with the system, the confirmation from at least one of the respective mobile devices;

based on receiving the confirmation, retrieve a shared item list, the shared shopping list comprising an indication of a plurality of items;

generate, by the system, a score for each item of the plurality of items for each user of the plurality of users, using a weighted combination of the appearance and the behavioral attributes of the respective user and product information of a respective item;

assign, by the system and based on the score for each item of the plurality of items for each user of the plurality of users, at least one item of the plurality of items to each user of the plurality of users based on the appearance and the behavioral attributes of the plurality of users and characteristics of the plurality of items; and based on assigning the at least one item of the plurality of items to each user of the plurality of users, cause a graphical element to be displayed on a display of a respective mobile device of each of the plurality of users, the graphical element corresponding to assignment information, the assignment information comprising indications of items assigned to the respective user.

17. The non-transitory computer-readable storage medium of claim 16, wherein the product information comprises an indication of location within a retail store, placement height, list of ingredients, weight attributes, or size attributes, and wherein the appearance and the behavioral attributes comprises at least one of an age, a weight, a mobility level, a reaching ability, a lifting ability, or a bending ability of the respective user.

* * * * *